United States Patent [19]
Rostamian

[11] Patent Number: 5,483,605
[45] Date of Patent: Jan. 9, 1996

[54] HIGH SPEED PATTERN RECOGNITION TECHNIQUE FOR IMPLEMENTATION OF RESOLUTION ENHANCEMENT ALGORITHMS INTO AN APPLICATION SPECIFIC INTEGRATED CIRCUIT (ASIC) DEVICE

[75] Inventor: Farhad Rostamian, Los Angeles, Calif.

[73] Assignee: Xerox Corporation, Stamford, Conn.

[21] Appl. No.: 173,015

[22] Filed: Dec. 27, 1993

[51] Int. Cl.$^6$ ................................ G06K 9/00; G06K 9/40
[52] U.S. Cl. .......................... 382/181; 382/209; 382/254; 395/101
[58] Field of Search ......................... 395/101, 109, 395/117, 115, 164–166, 425, 116, 157; 382/54, 30, 48, 10, 181, 209, 254; 358/447, 448; 345/136

[56] References Cited

U.S. PATENT DOCUMENTS 5,237,646   8/1993   Bunce ........................ 395/117

Primary Examiner—Raymond J. Bayerl
Assistant Examiner—Kee M. Tung
Attorney, Agent, or Firm—Robert Cunha

[57] ABSTRACT

A circuit to be used just prior to the printing engine to improve the image quality of a raster output scanner by modifying the darkness, size or shape of the spot. A buffer holds a window of n by n image pixels, and compares the bit pattern to a set of templates. For each match, a correction number is output, each correction number being a gray scale, duty cycle or bit pattern to be used to correct the center pixel of the current window. The comparison logic, instead of comparing the entire set of bits in the window to the templates, uses a number of small logic blocks in parallel, each comparing a subset of bits from the window. The output from this first set of comparisons is substantially reduced from the original set. This reduced set is now input to a second logic block which generates the final correction output bits. By using two stages, the first stage being a number of smaller logic blocks, the speed of the process is increased and the number of parts and the complexity of the circuit is reduced 1 Claim, 4 Drawing Sheets

HIGH SPEED PATTERN RECOGNITION TECHNIQUE FOR IMPLEMENTATION OF RESOLUTION ENHANCEMENT ALGORITHMS INTO AN APPLICATION SPECIFIC INTEGRATED CIRCUIT (ASIC) DEVICE

BACKGROUND OF THE INVENTION

An improved circuit for enhancing the print quality of a laser raster output scanner (ROS), and more specifically, architecture for reducing the amount of comparator circuitry needed to compare a large number of templates, each having a large number of bits, to an image area surrounding the pixel to be corrected, to produce a video correction signal.

In a typical laser driven raster output scanner, output pixels are either black or white. A problem with lower cost printers is that in an image having a reduced number of pixels per inch, diagonal lines appear to be jagged as a result of relatively large pixels being added to or subtracted from each succeeding raster. This results in artifacts in the form of steps in what should appear as a straight line. This problem is clearly shown in U.S. Pat. No. 5,005,139 which is incorporated by reference herein. In the left center of FIG. 3 of that patent there is shown the result of attempting to print a diagonal line with vertical rasters, and the jagged appearance of the result.

One common solution to this problem is to move to a higher resolution. Therefore, while the artifact is noticeable at 200 spots per inch, it is considerably less noticeable at 600 or more spots per inch.

A lower cost option is to keep the same resolution but to intervene just before the laser engine to vary the shape and/or size of the spots. For example, if the top one or two pixels within the circle 71 in FIG. 3 of the incorporated patent could be shifted slightly to the left, and the bottom one or two could be shifted slightly to the right, the appearance would be considerably improved.

This can be accomplished by printing dots at some fraction of their normal intensity to either the right or left of the main dots, and/or by printing the main dots at a fraction of their full intensity, as shown in the center 75 of FIG. 3. Because close laser dots tend to clump together, the effect is to shift the position of the dot to the right or left, thereby improving the appearance of the image.

The decision of whether or not to print a partial dot is made by comparing the pixels of the surrounding image to a set of templates. If a match is found, a correction is made to the center pixel. This is shown in the right side of FIG. 3. For example, the pixels within the template of the irregular shape shown at 81 is compared to the image surrounding the top dot of line 75. In this case there is a match, and the table lookup for this template will order that a dot of more than half but less than full intensity should be printed. Similarly, the image surrounding the bottom pixel will match template 87, and a pixel of less than half intensity will be produced. In a prior commercial printer, a large number of bits per template would be 49, and several hundred would be considered a large number of templates.

In a modern design facility, a software tool would be used to design the matrix of gates for the circuit for this matching process. Specifically, the number of inputs and outputs and each transfer function would be specified, and the tool would design a gate circuit that would perform the task.

Using this system, as the number and size of the templates rises linearly, the number of gates, and the time it takes for the resultant circuit to operate, rises at a compounded rate, and at sizes significantly larger than those given in the example above, the design of a commercially feasible circuit becomes impossible. What is needed is a circuit having a different configuration which can be used for a larger number of larger templates.

SUMMARY OF THE INVENTION

This invention uses two pipelined stages of matrices, or logic blocks, which reduce the number of gates required. As a result, the number of additional gates goes up only moderately for a significant increase in the number and size of the templates.

The first matrix or logic block stage breaks up the original image window into a number of small image segments and uses a number of matrices in parallel for the first comparison. In this case each matrix would have a fraction of the original number of input lines, and a smaller yet number of output lines representing the number of matches that would be possible in it. To use a numerical example, assume a template size of 9×9 bits. This could be split up into nine segments, each 3×3 bits in size, each segment having an input of 9 bits. If the system had a total of 500 templates, the average number of matches in each segment would be about 45 to 60, and could therefore be represented by a 6 bit number. Therefore the total number of bits that have to be resolved have been reduced to 45 to 60, down from the original 9×9=81.

The second stage is another matrix, just as in the prior art, but having the reduced number of input bits, and a number of output bits representing the number of gray levels that can be produced. Thus, to continue using the example, if there are a possibility of 512 gray levels, there must be 9 output bits and, as shown above, 54 input bits. An example of the total number of gates in both matrices, using this inventive system, would be about 2,200 gates for 216 templates, each 9 by 9 bits in size, and since the number of gates grows slowly for larger numbers of larger templates, up to several thousand templates, each 9 by 9, would be commerically feasible.

Since these two stages are pipelined, the speed of the slower matrix (the second) is determining. That is because the speed of a matrix is determined by the number of gates within it, and the first set of matrices comprise a number of small matrices in parallel. The incorporated Patent used a 49 bit×several hundred (templates) bit matrix. The above example uses about the same size second matrix, 54×200, and would therefore run at about the same speed, to process the same number of larger (9×9 bit) templates.

Generally, for a circuit using a large number of templates, each of a large size, this invention produces an output using a smaller number of gates, and running at a faster speed. Ultimately, for very large systems, this invention will yield a usable design where the prior art method would simply not be able to generate a commercially feasible solution.

For very large templates, such as 11×11 bits or larger, it may be more efficient to use a three stage system rather than the two stage system described above.

DETAILED DESCRIPTION OF THE INVENTION

Figure 1:
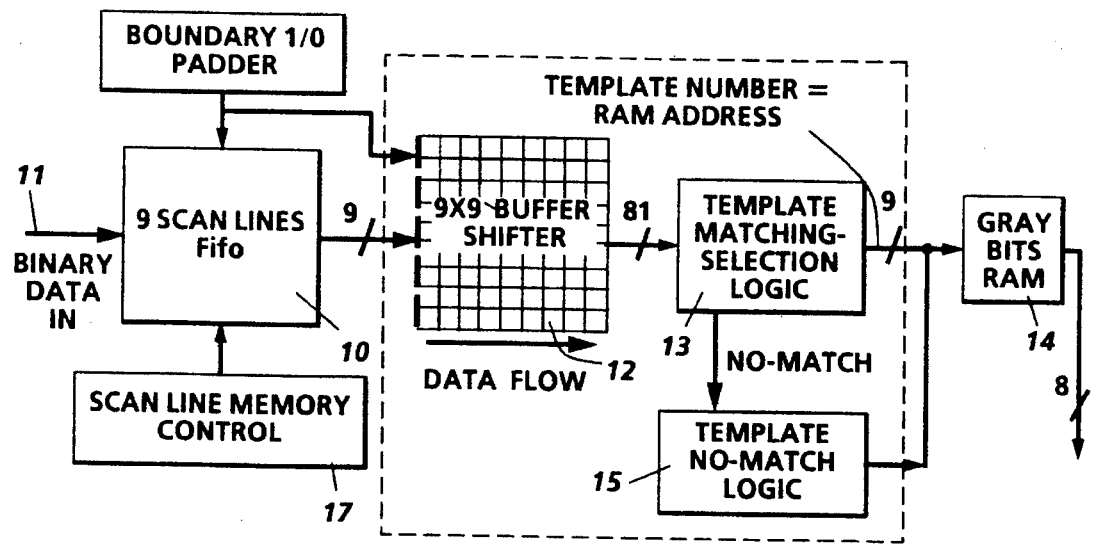
FIG. 1 is an overall block diagram of the system.
Figure 2:
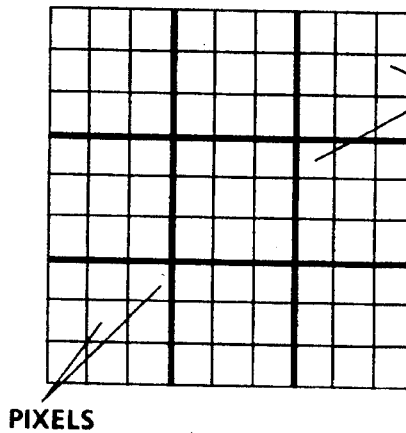
FIGS. 2 through 5 are examples of possible segmentations of the window.

FIG. 1 is an overall block diagram of the complete system. Nine complete scan lines are stored in the FIFO 10, and the image bits appearing in the nine by nine bit window surrounding the current pixel, the pixel being processed at the moment, are loaded into the Shifter 12. The state of these 81 bits is applied in parallel to the template matching logic 13 where the windowed image is compared to a number of templates. If there is a match, a nine bit (in general n bits where $2^n$ is equal to N where N is the number of templates; for about one thousand templates, n=10 bits) video control signal is output, in this embodiment, to a RAM 14 which produces an 8-bit (in general, 4–8 bits) output correction number. This correction number may be a gray level as shown in FIG. 1, but it may be a number representing the configuration of pulses within the pixel, a duty cycle description, or any other pulse arrangement that will vary the shape and darkness of the final pixel output by the ROS. This is fed into a parallel to serial converter (not shown) to serialize the 4–7 bit correction number and send the serial bits to the ROS to control the intensity of the output laser beam. If there is no match between the image and any template, the logic 15 controls the circuit to output the current pixel in its original black or white state. After the current pixel is processed, nine bits corresponding to the next column is shifted from the FIFO 10 into the shifter 12, which moves the entire window one pixel to the right, to surround the next pixel to be processed, and the process is repeated. Finally, when one line of current pixels is processed, the scan memory control will load the FIFO with the next raster and the process will be repeated for the next line of pixels.

Figure 3:
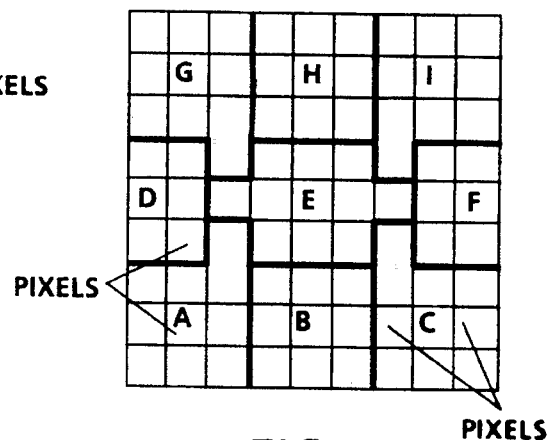
Figure 4:
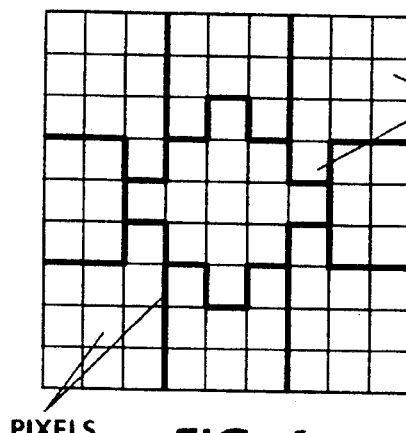
Figure 5:
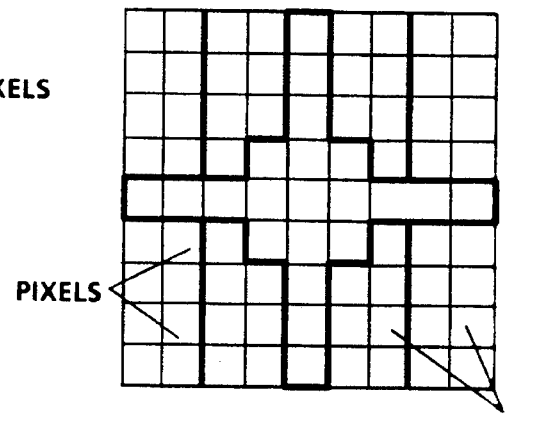

The Shifter 12 in this invention is divided into a number of sub areas. Several possibilities for a 9×9 bit matrix divided into 9 sub areas are shown in FIGS. 2–5. The sub areas need not be of the same shape or size. In addition, there can be more or less than nine sub areas. The division as shown in FIG. 3 will be used as the example in the remainder of this discussion.

Figure 6:
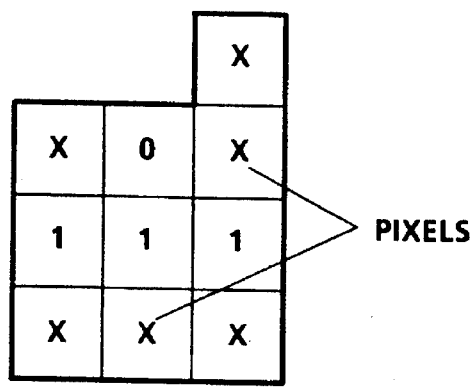
FIGS. 6, 7 and 8 are three examples of templates for one segment.
Figure 7:
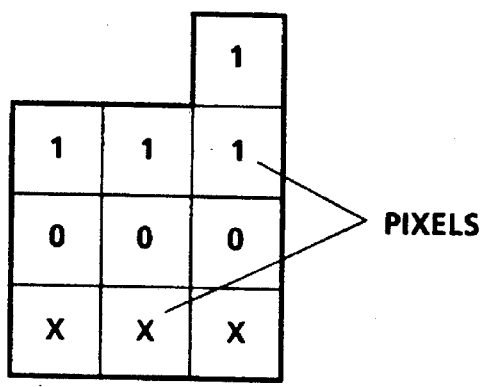
Figure 8:
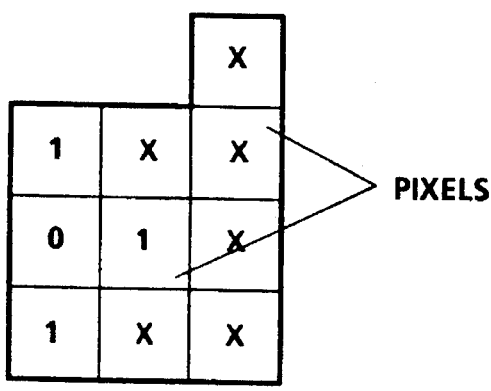

Sub area A of FIG. 3 is shown with various sub templates in FIGS. 6, 7 and 8. If a template requires that a particular bit must be a 1, it contains a 1. If the template requires a 0, it is shown as a 0. A "don't care" is shown as an X.

Since these patterns of FIGS. 6, 7 and 8 are for only one of nine sub templates, it follows that a match for this sub area can result for a number of complete patterns. By simulation, it has been determined that for the disclosed embodiment, a match will occur in sub area A for a maximum of 32 entire templates, and therefore 5 bits have been set aside as output bits.

Figure 9:
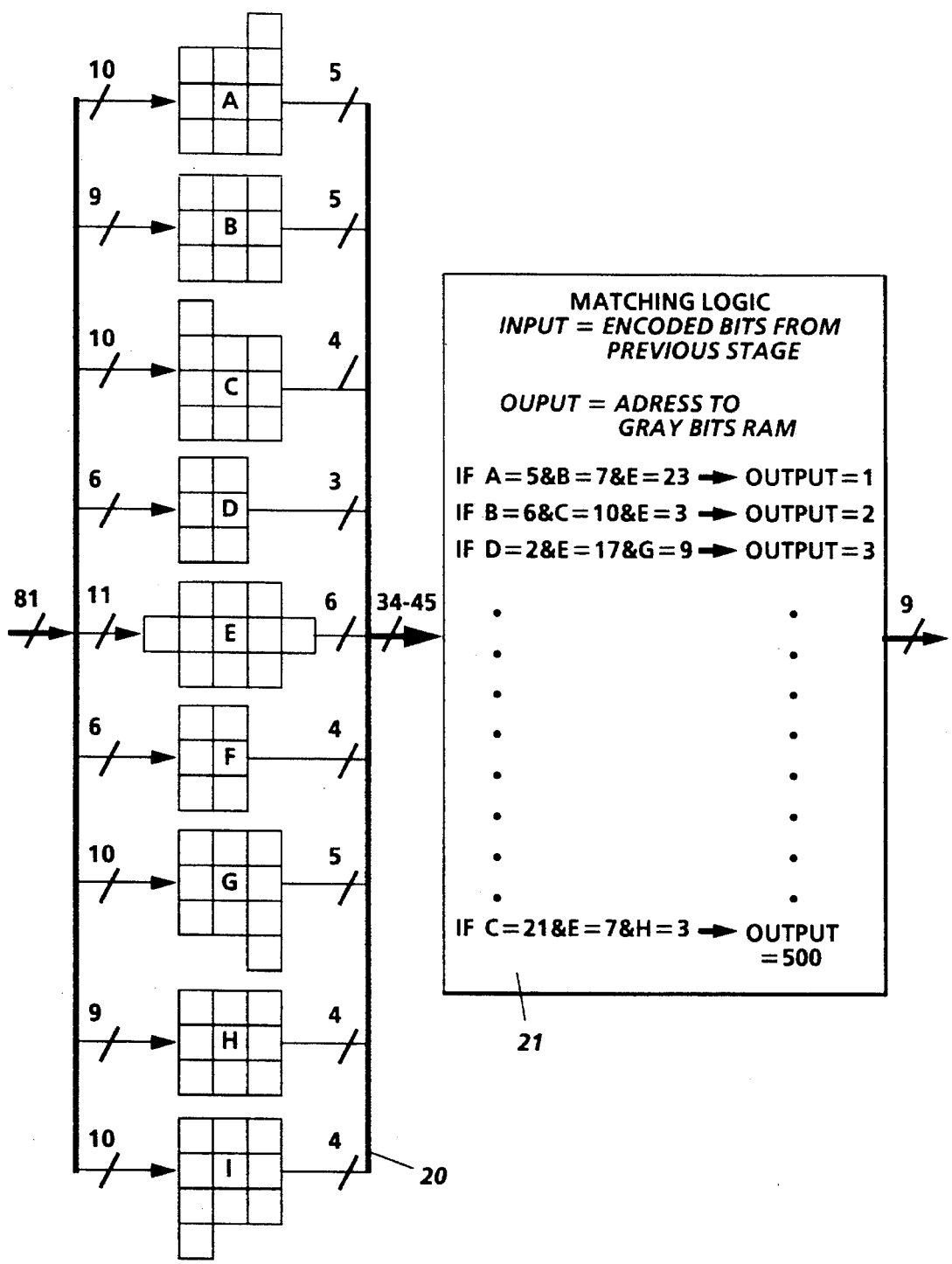
FIG. 9 is a more detailed diagram of the matching circuit.

The left side of FIG. 9 shows the entire set of sub templates, A through I, and indicates the number of lines output from each. The total number of lines in this case is 40, but could easily vary from 35 to 45 for any specific application. Here it can be seen that there is a net reduction of lines from the input to the output of the set of sub matrices from 81 to 40. This is a result of two factors. First there are a number of "don't care" bits which limit the possible number of matches, and second, there are a number of patterns for which the contents of each sub area are equal, or shared. When all of these redundancies are taken out, the number of output lines of the first matrix is approximatly half the number of input lines.

This new and reduced set of lines is now applied to a second matching logic matrix 21, which produces the template matching output, nine bits in this example.

Figure 10:
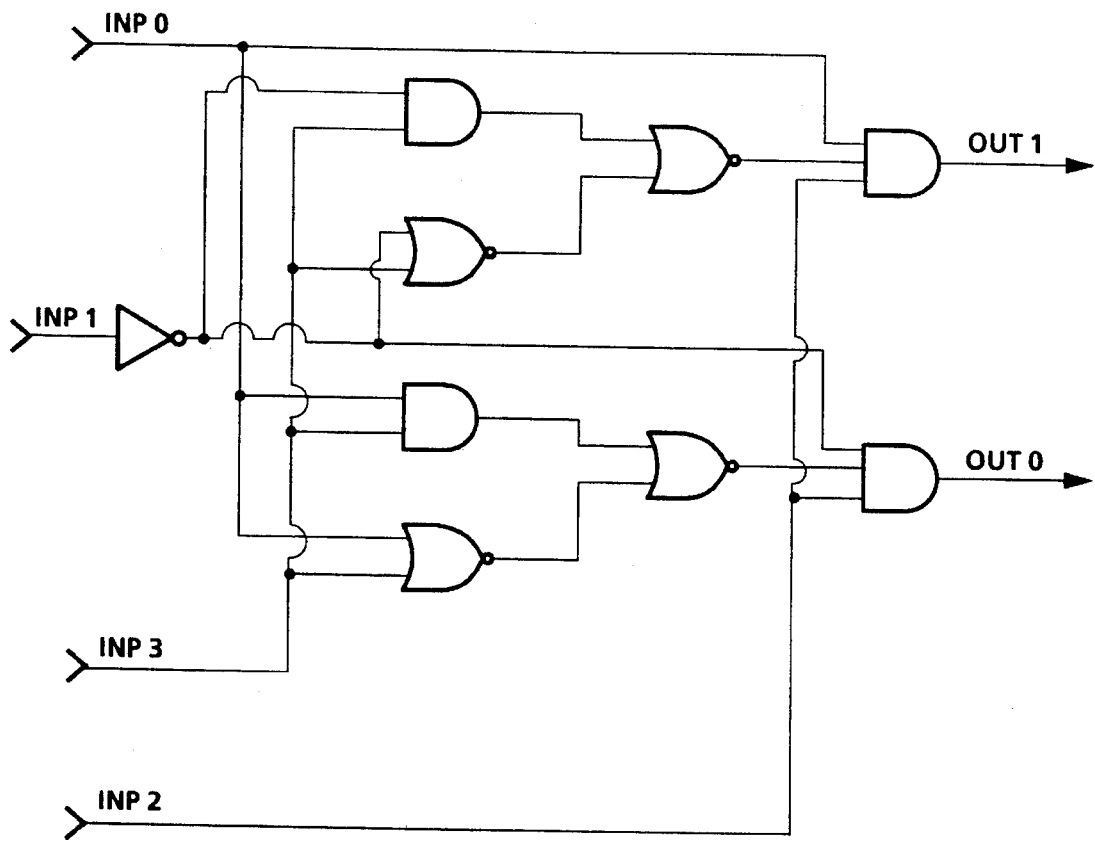
FIG. 10 is a simple example of a pattern matching logic block.

All of the logic blocks in FIG. 9 are ASIC gate arrays. Each array on the left has between 6 and 11 inputs and 3 to 6 outputs. The large gate array on the right has 35 to 45 inputs and 9 outputs. An example of a gate array having 4 inputs and 2 outputs is shown in FIG. 10.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. A circuit for receiving a number n of scan lines of video pixels and for producing for each n by n pixel window, where n is an odd integer, output bits representing the correction that must be made to the pixel central to said window to improve the final image, comprising:

means for storing n scan lines of pixels, a buffer for receiving and storing an n by n pixel segment from said means for storing, m logic blocks, each logic block having a plurality of inputs, the total number of inputs to all of said logic blocks combined being n×n and responsive to all of the pixels stored in said buffer, for producing therefrom intermediate bits, and, a matching block responsive to said intermediate bits output by said m logic blocks for producing said output bits.

* * * * *